(12) United States Patent
Biginton

(10) Patent No.: US 10,953,536 B2
(45) Date of Patent: Mar. 23, 2021

(54) SUPPORT ARRANGEMENT FOR SUPPORTING A LOAD IN AN ELEVATED POSITION

(71) Applicant: The Magstim Company Limited, Whitland (GB)

(72) Inventor: Matthew Biginton, Newcastle (GB)

(73) Assignee: The Magstim Company Limited, Whitland (GB)

( * ) Notice: Subject to any disclaimer, the term of this patent is extended or adjusted under 35 U.S.C. 154(b) by 132 days.

(21) Appl. No.: 16/403,354

(22) Filed: May 3, 2019

(65) Prior Publication Data
US 2020/0346339 A1    Nov. 5, 2020

(51) Int. Cl.
*B25H 1/00*    (2006.01)
*B65D 5/16*    (2006.01)

(52) U.S. Cl.
CPC .............. *B25H 1/0028* (2013.01); *B65D 5/16* (2013.01); *F16M 2200/04* (2013.01)

(58) Field of Classification Search
CPC ..... B25H 1/0028; B66D 5/16; F16M 2200/04
See application file for complete search history.

(56) References Cited

U.S. PATENT DOCUMENTS

| | | | | |
|---|---|---|---|---|
| 580,770 A | * | 4/1897 | Cashion ................. | A63J 1/028 472/78 |
| 826,629 A | * | 7/1906 | Trenamen ............... | H02K 5/00 310/91 |
| 842,656 A | * | 1/1907 | Hardsocg ............... | F16M 11/10 248/648 |
| 910,112 A | * | 1/1909 | Carter .................... | A61B 6/105 248/331 |
| 1,448,428 A | * | 3/1923 | Bowman .............. | B25H 1/0028 81/54 |
| 1,470,296 A | * | 10/1923 | Stedman .............. | B25H 1/0028 248/123.2 |
| 2,176,979 A | * | 10/1939 | Platz .................... | B23K 11/318 248/328 |

(Continued)

*Primary Examiner* — Eret C McNichols
(74) *Attorney, Agent, or Firm* — Kilpatrick Townsend & Stockton LLP

(57) ABSTRACT

The present invention relates to a support arrangement for supporting a load at an elevated position, particularly where the load can then be used for its intended purpose at an elevated position and where the weight of the load is supported. The support arrangement comprises a support structure and a weight balancing device supported by the support structure for balancing the weight of a load, the weight balancing device having a first line extending therefrom and having a distal end for engaging with a load, where the first line is extendable and retractable from the weight balancing device to enable balancing of the weight of the load at a desired elevation. The support arrangement further comprises a retractor device comprising a carrier receiving a second line where the second line is retractable and extendable from the carrier, the second line having a distal end secured to the first line at a securing location such that as the first line is extended the second line retracts onto the carrier, and conversely as the first line is retracted the second line deploys from the carrier, the retractor device further comprising a restrictor for restricting the speed of deployment of the second line from the carrier.

10 Claims, 2 Drawing Sheets

(56) References Cited

U.S. PATENT DOCUMENTS

| | | | |
|---|---|---|---|
| 2,801,814 A | 8/1957 | Fischer et al. | |
| 2,868,043 A * | 1/1959 | Robbins | B23B 41/003 408/135 |
| 3,495,798 A * | 2/1970 | Galbarini | B66B 17/12 248/364 |
| 4,872,632 A * | 10/1989 | Johnson | A47F 5/0892 248/332 |
| 5,316,260 A * | 5/1994 | Johnston | A61B 3/18 248/123.2 |
| 6,087,611 A * | 7/2000 | De Bruyn | B23K 11/28 219/86.25 |
| 6,099,459 A * | 8/2000 | Jacobson | A61N 2/02 128/897 |
| 6,481,108 B1 * | 11/2002 | Helinski | B25H 1/0028 224/262 |
| 6,691,960 B2 * | 2/2004 | Metelski | G02B 7/001 248/123.2 |
| 7,000,873 B2 * | 2/2006 | Metelski | F16M 11/08 248/123.11 |
| 9,884,200 B2 * | 2/2018 | Pillutla | A61N 2/02 |
| 2004/0172012 A1 * | 9/2004 | Otsuka | A61B 90/50 606/1 |
| 2005/0228209 A1 * | 10/2005 | Schneider | A61N 2/006 600/13 |
| 2006/0161039 A1 * | 7/2006 | Juliana | A61N 2/006 600/9 |
| 2006/0287566 A1 * | 12/2006 | Zangen | A61N 2/02 600/15 |
| 2008/0022546 A1 * | 1/2008 | Trudel | B25H 1/0028 34/90 |
| 2015/0360363 A1 * | 12/2015 | Hohmeier | E04G 5/00 182/113 |
| 2016/0221089 A1 * | 8/2016 | Ugur | B25H 1/0028 |
| 2019/0247994 A1 * | 8/2019 | Angold | F16M 13/022 |
| 2019/0299394 A1 * | 10/2019 | Bellikka | B25H 1/0028 |
| 2019/0367066 A1 * | 12/2019 | Nelson | B25H 1/0028 |
| 2020/0153221 A1 * | 5/2020 | Byrne | H02G 11/02 |

* cited by examiner

SUPPORT ARRANGEMENT FOR SUPPORTING A LOAD IN AN ELEVATED POSITION

The present invention relates to a support arrangement for supporting a load at an elevated position, particularly where the load can then be used for its intended purpose at an elevated position and where the weight of the load is supported.

Weight balancing devices are widely used to take the weight of a load providing a zero gravity effect. They comprise a spool carrying a line, where the distal end of the line can be attached to a load. The weight balancing device may comprise a coil spring that is tensioned as the line is unwound from the spool, where the tension in the coil spring can be adjusted to match the required load. The load, which is typically a tool, can then be used as required without the user having to support the weight of the tool themselves, however the use of the tool is generally unimpeded.

A problem exists however with weight balancing devices in that sudden removal of the load leads to corresponding sudden retraction of the line. This causes a potential danger to the operator, and depending on the application, to other individuals in the near vicinity. This is particularly relevant where the load is a medical apparatus, and the medical apparatus is positioned adjacent to or in contact with a patient when in operation. There is thus a potential risk in that the load may come undone or else the line may break, leading to sudden retraction of the line which could potentially impact upon the operator or patient causing significant harm.

The present invention seeks to address the above-mentioned problem, or at least provide a suitable alternative solution.

According to an aspect of the present invention there is a support arrangement for supporting a load in an elevated position, the support arrangement comprising:
 a support structure;
 a weight balancing device supported by the support structure for balancing the weight of a load, the weight balancing device having a first line extending therefrom and having a distal end for engaging with a load, where the first line is extendable and retractable from the weight balancing device to enable balancing of the weight of the load at a desired elevation;
 a retractor device comprising a carrier receiving a second line where the second line is retractable and extendable from the carrier, the second line having a distal end secured to the first line at a securing location such that as the first line is extended the second line retracts onto the carrier, and conversely as the first line is retracted the second line deploys from the carrier, the retractor device further comprising a restrictor for restricting the speed of deployment of the second line from the carrier.

The load is beneficially a medical apparatus. The medical apparatus is preferably a Magnetic Stimulation (MS) coil arrangement, even more preferably a Transcranial Magnetic Stimulation (TMS) coil arrangement.

Although the invention has been described with reference to supporting a medical apparatus at an elevated position, the claimed invention is also suitable for supporting other loads. For example, it may be desirable for example to support a tool at an elevated position providing improved safety in combination with the manoeuvrability and weight carrying properties associated with the use of a weight balancing device.

The first and second lines are beneficially flexible. The first line is preferably a flexible cable, and may be constructed of wound fibres. The wound fibres may be metal. The wound fibres are preferably encapsulated, at least in the longitudinal axis of the cable, in a casing. The second line may comprise a belt or webbing material. Such a webbing material is typically used in vehicle seat belts.

The distal end of the first line preferably comprises a connector arranged to be releasably engageable with a load. A suitable connector may comprise a user operable release mechanism to prevent unintended release of the connector from the load.

The support arrangement preferably comprises an upstand and a support arm extending from the upstand towards a distal end, the first line projecting downwardly from the support arm. The first line preferably projects towards the distal end of the support arm before projecting downwardly from the support arm. The retractor device is preferably positioned closer to the distal end of the support arm than the position at which the first line projects downwardly from the support arm. The weight balancing device is preferably positioned toward the proximal end of the support arm. A configuration whereby the weight balancing device and the retractor device are generally aligned longitudinally in the longitudinal axis of the support arm is preferred.

The support arrangement preferably further comprises a positioning arm extending from the support structure to a distal end adapted to engage with a tool, the positioning arm being configurable between a release configuration whereby the arm is moveable between a plurality of positions and a locked configuration whereby the positioning arm is locked relative to the support arrangement. This allows the tool, which is preferably a medical apparatus, to be manipulated to a desired orientation and position with ease to a desired location. The desired location may be a desired location relative to a subject, and may be a location that is critical to accurately appropriately treat a subject. For example, in TMS the treatment location must be accurately determined and treatment must be administered at that treatment location. The positioning arm therefore allows this position to be located and the medical apparatus appropriately fixed in that treatment location. It will be appreciated that the positioning arm can move and orientate the tool with ease as the weight of the tool is being balanced by the weight balancing device.

The distal end of the positioning arm preferably comprises an engagement formation for engaging with a tool. The arm is beneficially moveable between a plurality of orientations.

The second line beneficially extends towards the distal end in a direction such that as the first line is extended the second line retracts onto the carrier, and as the first line is retracted the second line deploys from the carrier. Thus, the retractor device and importantly the second line in particular adjacent the distal end must be orientated to achieve this functional requirement. It is beneficial such that the second line extends substantially linearly from exiting the carrier to the distal end, but it will be appreciated that the direction the second line may take may be altered through the provision of one or more pulleys for example.

As identified, it is important that as the first line is extended the second line retracts onto the carrier, and conversely as the first line is retracted the second line deploys from the carrier. Accordingly, at least a portion of the second line extending from the securing location towards the carrier projects in a direction generally in the direction that the first line moves when moving between the retracted and extended configuration. At least a portion of the second line extending from the securing location towards the carrier may be substantially aligned with a portion of the first line. This ensures that under circumstances of a sudden release of the load from the distal end of the first line and thus retraction by the weight balancing device, then there is corresponding deployment of the second line and the restrictor thereby acts to restrict speed of deployment and thereby speed of retraction of the first line. It will be appreciated that the direction of movement of the first and/or second lines can be readily manipulated through the addition of one or more pulleys for example.

The retractor device, and in particular the restrictor, restricts the speed of deployment of the second line from the carrier, and preferably prevents deployment once a threshold speed of deployment is reached. The retractor device beneficially comprises an arrestor for arresting deployment when a threshold deployment speed is reached. The restrictor device beneficially comprises a locking mechanism for preventing rotation of the carrier. The locking arrangement is preferably arranged to automatically deploy in the event that the carrier rotates at a threshold speed.

According to a further aspect of the present invention there is a Transcranial Magnetic Stimulation (TMS) apparatus comprising a TMS coil comprising one or more windings and a support arrangement for supporting the TMS coil in an elevated position, the support arrangement comprising:
a support structure;
a weight balancing device supported by the support structure for balancing the weight of the TMS coil, the weight balancing device having a first line extending therefrom and having a distal end engaged with the TMS coil, where the first line is extendable and retractable from the weight balancing device to enable balancing of the weight of the TMS coil at a desired elevation;
a retractor device comprising a carrier receiving a second line where the second line is retractable and extendable from the carrier, the second line having a distal end secured to the first line at a securing location such that as the first line is extended the second line retracts onto the carrier, and conversely as the first line is retracted the second line deploys from the carrier, the retractor device further comprising a restrictor for restricting the speed of deployment of the second line from the carrier.

It will be appreciated that the TMS coil may comprise one or more windings, typically comprising two windings. The apparatus preferably further comprises a stimulator for supplying current through the TMS coil.

Aspects of the present invention will be described by way of illustration only with reference to the accompanying Figures, where:

Figure 1:
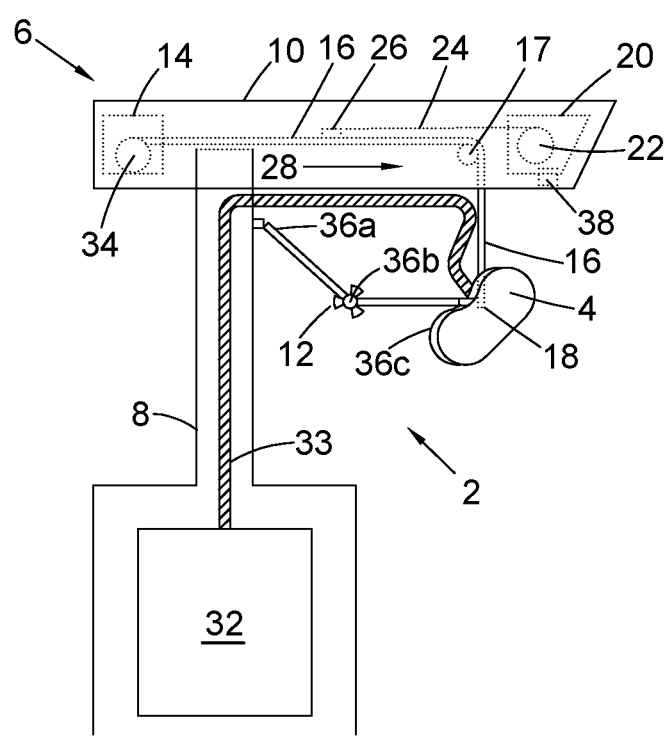
FIG. 1 is a schematic representation of an illustrative embodiment of the present invention.

Referring to FIG. 1 where is a support arrangement 2 for supporting a load 4 in an elevated position. In the illustrative embodiment the load 4 comprises a TMS coil designed to induce a small current flow in a patient. In operation it is important to be able to accurately position the TMS coil relative to a patent in order to apply the desired treatment to the patient, and a TMS coil for example may be heavy. A weight of up to 5*kg* is typical. For this reason, and also to ensure that the TMS coil remains supported during treatment, the present invention provides a support arrangement 2 comprising a support structure 6 for positioning the TMS coil at an elevated position. The support arrangement 2 comprises an upstand 8, a support arm 10 extending from the upstand and a positioning arm 12 extending from the support structure to a distal end adapted to engage with the load 4. A weight balancing device 14 is carried by the support arm 10 for balancing the weight of a load, the weight balancing device having a first line 16 extending therefrom and having a distal end 18 for engaging with a load 4. The distal end 18 of the first line comprises a connector arranged to be releasably engageable with a load. A suitable connector may comprise a user operable release mechanism to prevent unintended release of the connector from the load.

The first line 16 is extendable and retractable from the weight balancing device to enable balancing of the weight of the load at a desired elevation. The first line extends longitudinally in the longitudinal axis of the support arm 10. The first line then passes over a roller 17 and out of the support arm 10 to be secured to the TMS coil 4. The support arrangement further comprises a retractor device 20 comprising a carrier 22 receiving a second line 24 which is retractable and extendable from the carrier 22. The second line 24 has a distal end secured to the first line 16 at a securing location 26. This configuration means that as the first line is extended from the weight balancing device 14 in a direction indicated by arrow 28, the second line 24 retracts onto the carrier 22, and conversely as the first line 16 is retracted the second line 24 deploys from the carrier 22. The retractor device 20 further comprises a restrictor 30 (not shown in FIG. 1) for restricting the speed of deployment of the second line from the carrier.

The load is beneficially a medical apparatus. As described above, the medical apparatus is preferably a Magnetic Stimulation (MS) coil arrangement, even more preferably a Transcranial Magnetic Stimulation (TMS) coil arrangement. A stimulator 32 is provided which passes a current through the windings of the TMS coil via an elongate cable 33.

The first and second lines are flexible meaning that they can be wound around carriers 22, 24 which may be termed spools. The first and optionally the second line may comprise a flexible cable, and may be constructed of wound metal fibres. The wound fibres are encapsulated in a casing.

The support arrangement further comprises a positioning arm 36 extending from the upstand 8 to a distal end adapted to engage with the TMS coil. The positioning arm 36 is reconfigurable between a release configuration whereby the arm is moveable between a plurality of positions and a locked configuration whereby the positioning arm is locked relative to the upstand 8. This allows the TMS coil to be manipulated to a desired orientation and position with ease to a desired location. It will be appreciated that the positioning arm can move and orientate the tool with ease as the weight of the TMS coil is being balanced by the weight balancing device through the provision of joints 36a-c.

An example of a weight balancing device 14 comprising a component of the present invention is a spring counterbalancing device. Such weight balancing devices are widely commercially available and will not described in detail. An example of such a spring counterbalancing device is a rotatable spool 34 on which is wound the first line 16 for carrying the TMS coil and a coil spring that is tensioned as the first line 16 is unwound. A safety mechanism that automatically locks the spool and thus prevents rotation in the event the coil spring fails may also be provided. An adjuster is provided to adjust the tension in the coil spring to an initial tension appropriate to support the load applied. Such devices are well known in the field of supporting portable tools in a production line, and an example may be found in U.S. Pat. No. 2,801,814.

The retractor device 20 is utilised to restrict the speed of deployment of the second line from the carrier 22. This is important in the event of a sudden removal of the weight applied to the weight balancing device 14. In such a scenario, the first line would be retracted with significant force due to the tension in the coil spring in the weight balancing device 14 meaning the distal end 18 of the first line 16 would present a significant danger to either an operator or a patient. The retractor device thus mitigates this risk. The retractor device 20 which may be termed an arrestor, may comprise a restrictor in the form of a locking mechanism 38 for preventing rotation of the carrier 22. The locking arrangement 38 automatically deploys in the event that the carrier 22 rotates at a threshold speed.

An illustrative embodiment of a retractor device 20 suitable for use as a component of the present invention is utilised as a restraint mechanism forming part of a vehicle seatbelt. Inside the retractor device 20, a spring applies a rotation force, or torque, to the carrier/spool 22. This works to rotate the spool 22 so it winds up any loose second line. When the second line is deployed out from the spool 22, the spool rotates counter-clockwise, which turns the attached spring in the same direction. Effectively, the rotating spool works to untwist the spring. The spring wants to return to its original shape, so it resists this twisting motion. If the second line 24 is released, the spring will tighten up, rotating the spool 22 clockwise until there is no more slack in the second line 24. The retractor device 20 has a locking mechanism 38 that stops the spool 22 from rotating when the second line 24 is deployed too quickly. This is triggered by sudden deployment of the second line 24, which will occur in the event that the load 4 is suddenly removed from the first line 16. In an illustrative design, only briefly referred to here and which is widely known particularly in vehicle seatbelt design is to provide a centrifugal clutch which may be a weighted pivoting lever mounted to the rotating spool 22. When the spool 22 spins slowly, the lever doesn't pivot at all. A spring keeps it in position. But when the second line is pulled quickly, spinning the spool 22 more quickly, centrifugal force drives the weighted end of the lever outward. The extended lever pushes a cam piece mounted to the retractor device housing. The cam is connected to a pivoting pawl by a sliding pin. As the cam shifts to the left, the pin moves along a groove in the pawl. This pulls the pawl into the spinning ratchet gear attached to the spool. The pawl locks into the gear's teeth, preventing counter-clockwise rotation.

Figure 2A:
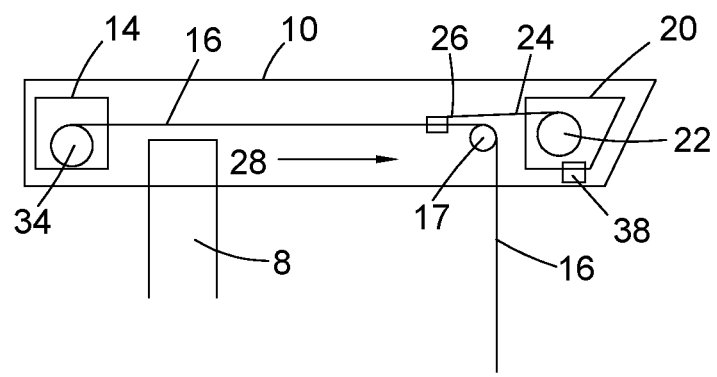
FIGS. 2a and 2b illustrate a schematic illustrative embodiment of the present invention.
Figure 2B:
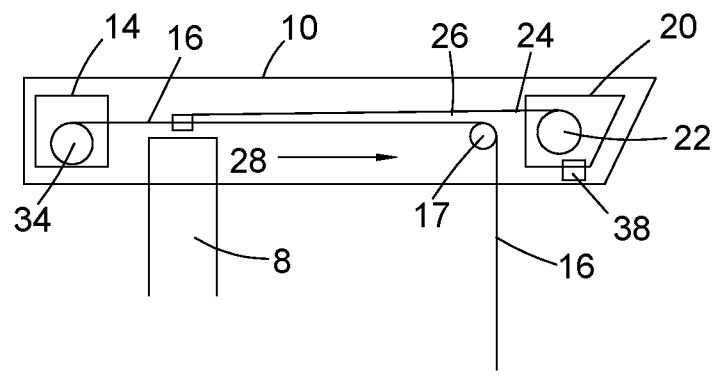

Presented in FIGS. 2a and b are the apparatus in two positions whereby the first line is extended from the weight balancing device 14 in FIG. 2a and where the first line 16 is relatively retracted into the weight balancing device in FIG. 2b.

In FIG. 2a, the first line 16 is relatively deployed, meaning that the load is at a lower elevation. The securing location 26 at which the second line 24 is fixed to the first line 16 can be seen to be adjacent to the retractor device 20 meaning that the second line 24 is relatively retracted onto the carrier 22. The retractor device 20 is positioned closer to the distal end of the support arm than the position at which the first line 16 projects downwardly from the support arm 10. The weight balancing device 14 is positioned toward the proximal end of the support arm 10. The weight balancing device 10 and the retractor device 20 are generally aligned longitudinally in the longitudinal axis of the support arm 10.

The second line 24 extends towards the securing location 26 in a direction such that as the first line is extended the second line retracts onto the carrier, and as the first line is retracted the second line deploys from the carrier. The second line extends substantially linearly from exiting the carrier to the securing location 26. The second line 16 extending from the securing location 26 towards the carrier is substantially aligned with a portion of the first line 16 intermediate the weight balancing device housing and the roller 17. This ensures that under circumstances of a sudden release of the load from the distal end of the first line 16 and thus retraction by the weight balancing device 14, then there is corresponding deployment of the second line 24 and the retractor device thereby acts to restrict speed of deployment and thereby speed of retraction of the first line.

Referring to FIG. 2b, the first line 16 is retracted onto the spool of the weight balancing device 14 and accordingly the securing location 26 is adjacent to the weight balancing device 14, and spaced away from the retractor device 20. Operation however remains the same in the event of sudden release of weight from the distal end of the first line 16, meaning the sudden retraction of the first line onto the spool of the weight balancing device 14 is prevented.

Aspects of the present invention have been described by way of example only and it will be appreciated to the skilled addressee that modifications and variations may be made without departing from the scope of protection afforded by the appended claims.

The invention claimed is:

1. A support arrangement for supporting a load in an elevated position, the support arrangement comprising:
    a support structure;
    a weight balancing device supported by the support structure for balancing the weight of a load, the weight balancing device having a first line extending therefrom and having a distal end for engaging with a load, where the first line is extendable and retractable from the weight balancing device to enable balancing of the weight of the load at a desired elevation;
    a retractor device comprising a carrier receiving a second line where the second line is retractable and extendable from the carrier, the second line having a distal end secured to the first line at a securing location such that as the first line is extended the second line retracts onto the carrier, and conversely as the first line is retracted the second line deploys from the carrier, the retractor device further comprising a restrictor for restricting the speed of deployment of the second line from the carrier.

2. The support arrangement of claim 1 further comprising an upstand and a support arm having a proximal end and a distal end, the support arm extending from the upstand towards the distal end of the support arm, the first line projecting downwardly from the support arm.

3. The support arrangement of claim 2 wherein the first line projects towards the distal end of the support arm before projecting downwardly from the support arm.

4. The support arrangement of claim 3 wherein the retractor device is positioned closer to the distal end of the support arm than the position at which the first line projects downwardly from the support arm.

5. The support arrangement of claim 2 wherein the weight balancing device is positioned toward the proximal end of the support arm.

6. The support arrangement of claim 1 further comprising a positioning arm extending from the support structure to a distal end of the positioning arm adapted to engage with a tool, the positioning arm being configurable between a release configuration whereby the arm is moveable between a plurality of positions and a locked configuration whereby the positioning arm is locked relative to the support arrangement.

7. A support arrangement according to claim 1 wherein at least a portion of the second line extending from the securing location towards the carrier projects in a direction generally in the direction that the first line moves when moving between a retracted and an extended configuration.

8. A support arrangement according to claim 7 wherein at least a portion of the second line extending from the securing location towards the carrier may be substantially aligned with a portion of the first line.

9. A support arrangement according to claim 1 wherein the restrictor device comprises a locking mechanism for preventing rotation of the carrier, and wherein the locking mechanism is arranged to automatically deploy in the event that the carrier rotates at a threshold speed.

10. A Transcranial Magnetic Stimulation (TMS) apparatus comprising a TMS coil comprising one or more windings and a support arrangement for supporting the TMS coil in an elevated position, the support arrangement comprising:

- a support structure;
- a weight balancing device supported by the support structure for balancing the weight of the TMS coil, the weight balancing device having a first line extending therefrom and having a distal end engaged with the TMS coil, where the first line is extendable and retractable from the weight balancing device to enable balancing of the weight of the TMS coil at a desired elevation;
- a retractor device comprising a carrier receiving a second line where the second line is retractable and extendable from the carrier, the second line having a distal end secured to the first line at a securing location such that as the first line is extended the second line retracts onto the carrier, and conversely as the first line is retracted the second line deploys from the carrier, the retractor device further comprising a restrictor for restricting the speed of deployment of the second line from the carrier.

* * * * *